Patented Feb. 8, 1949

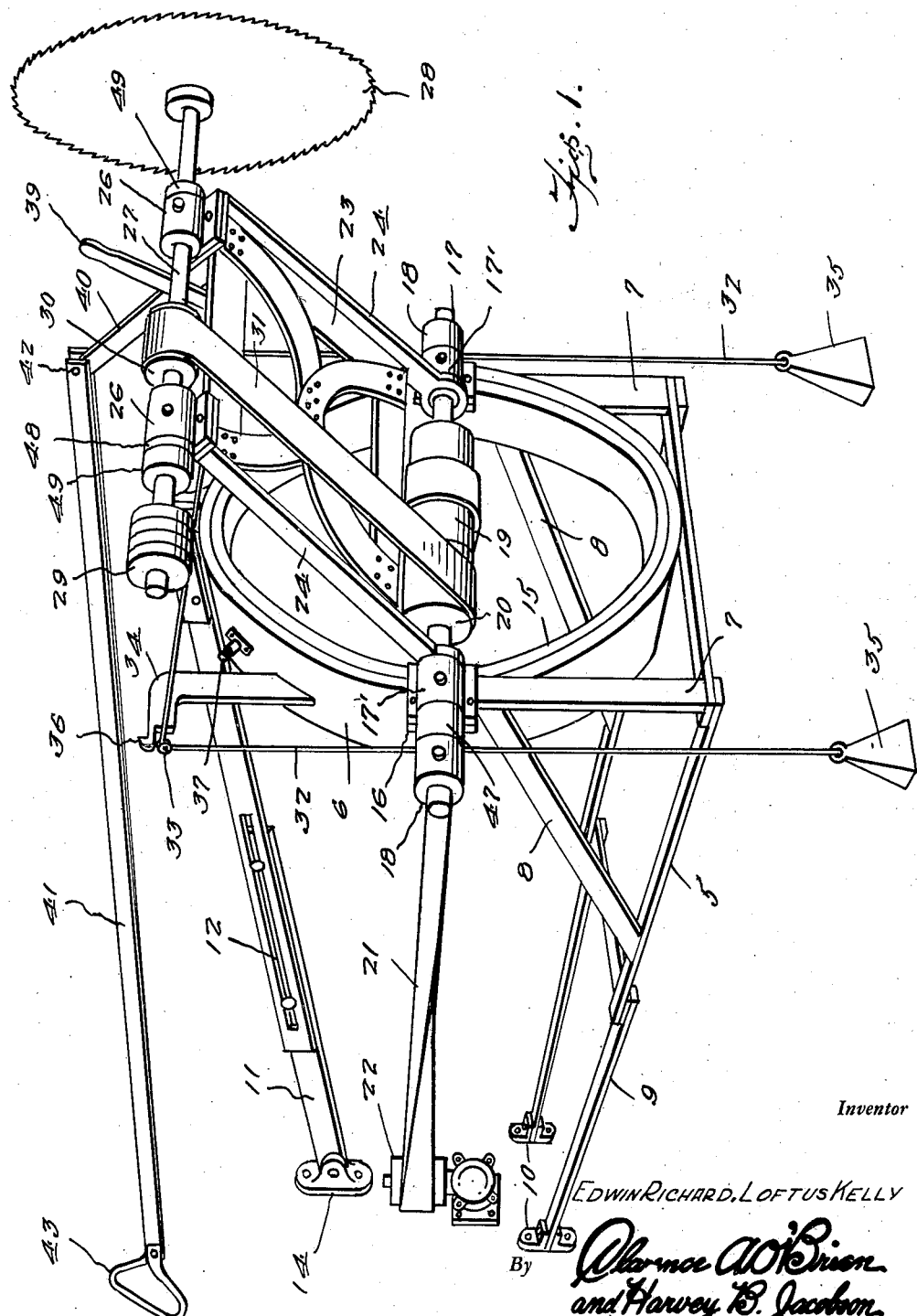

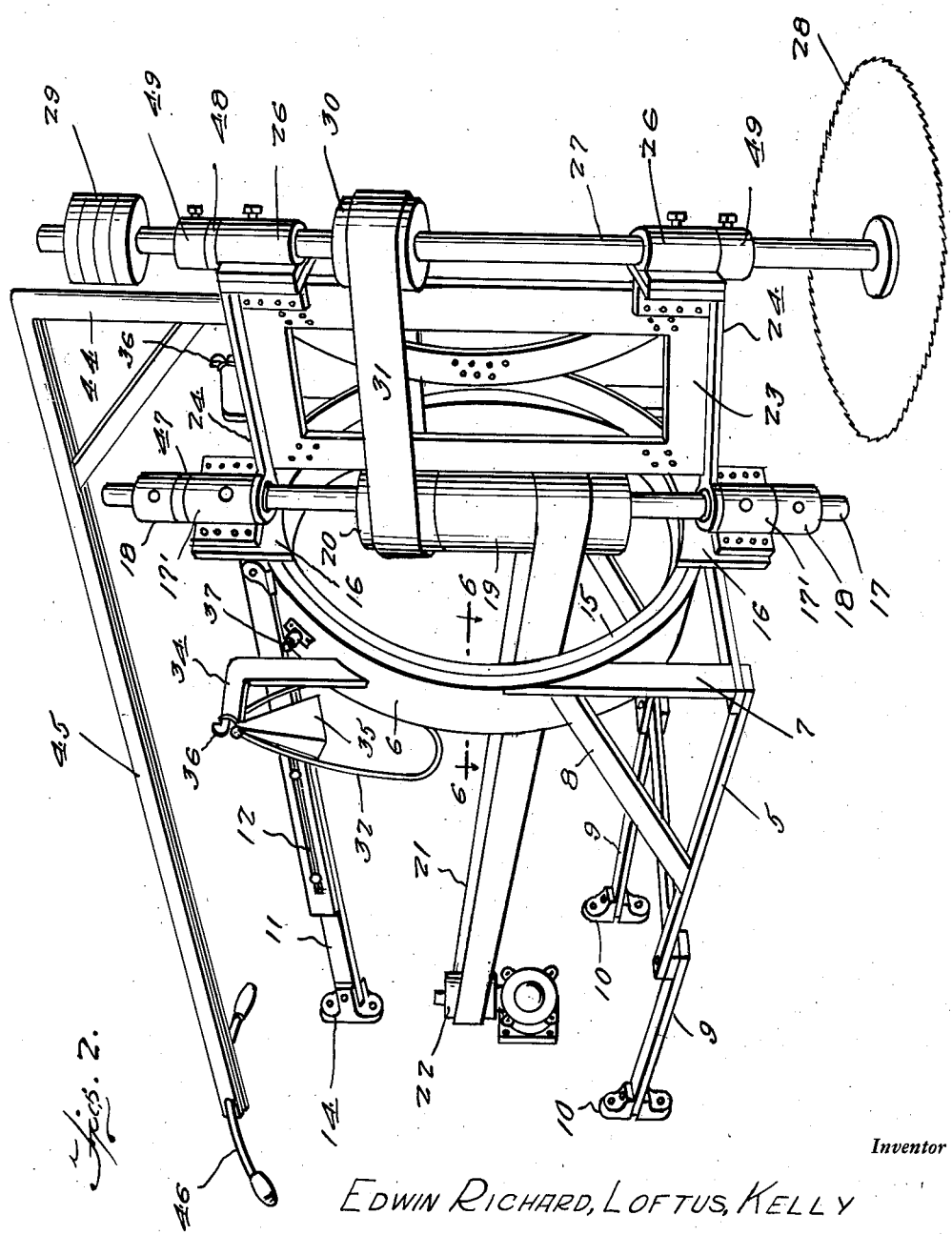

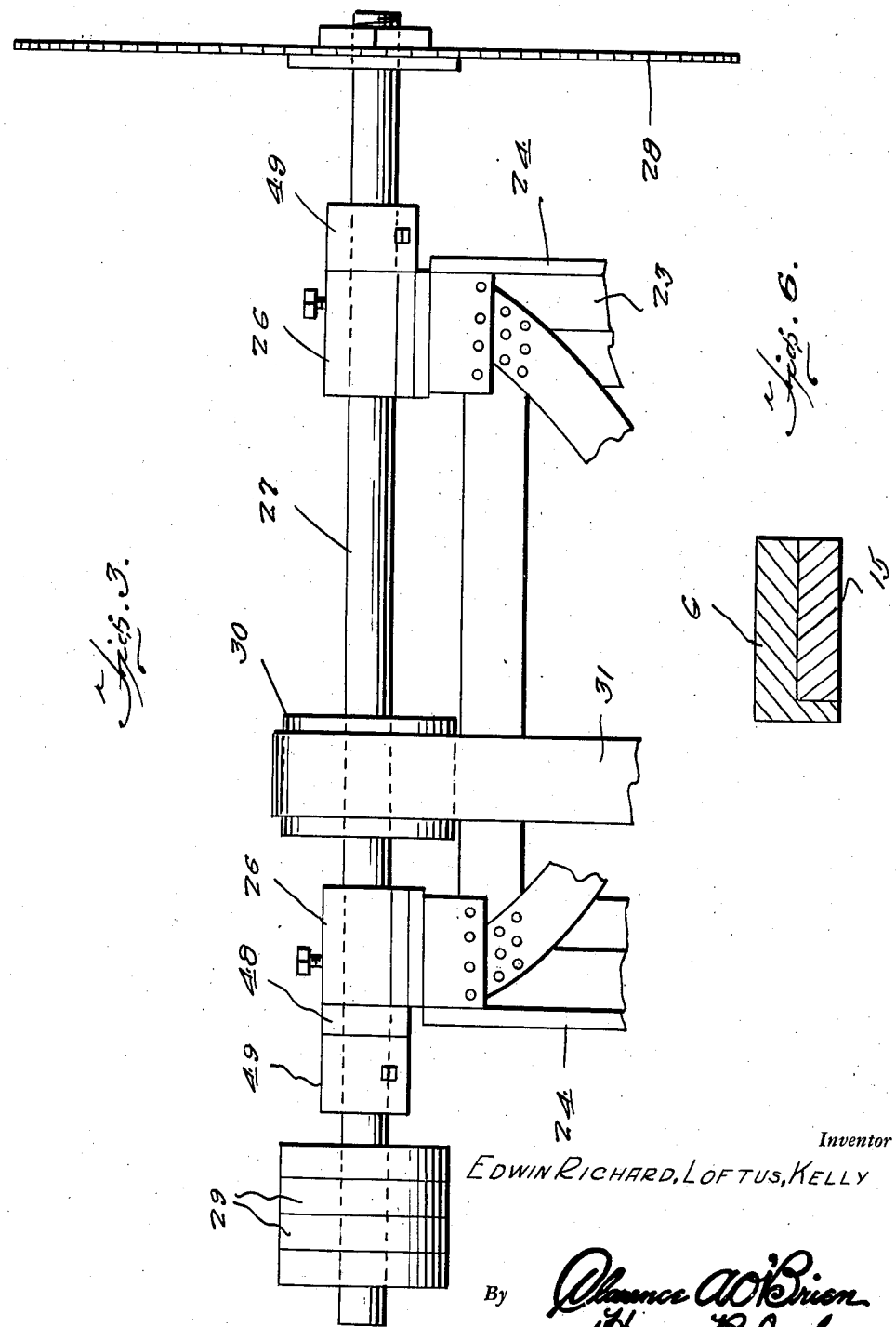

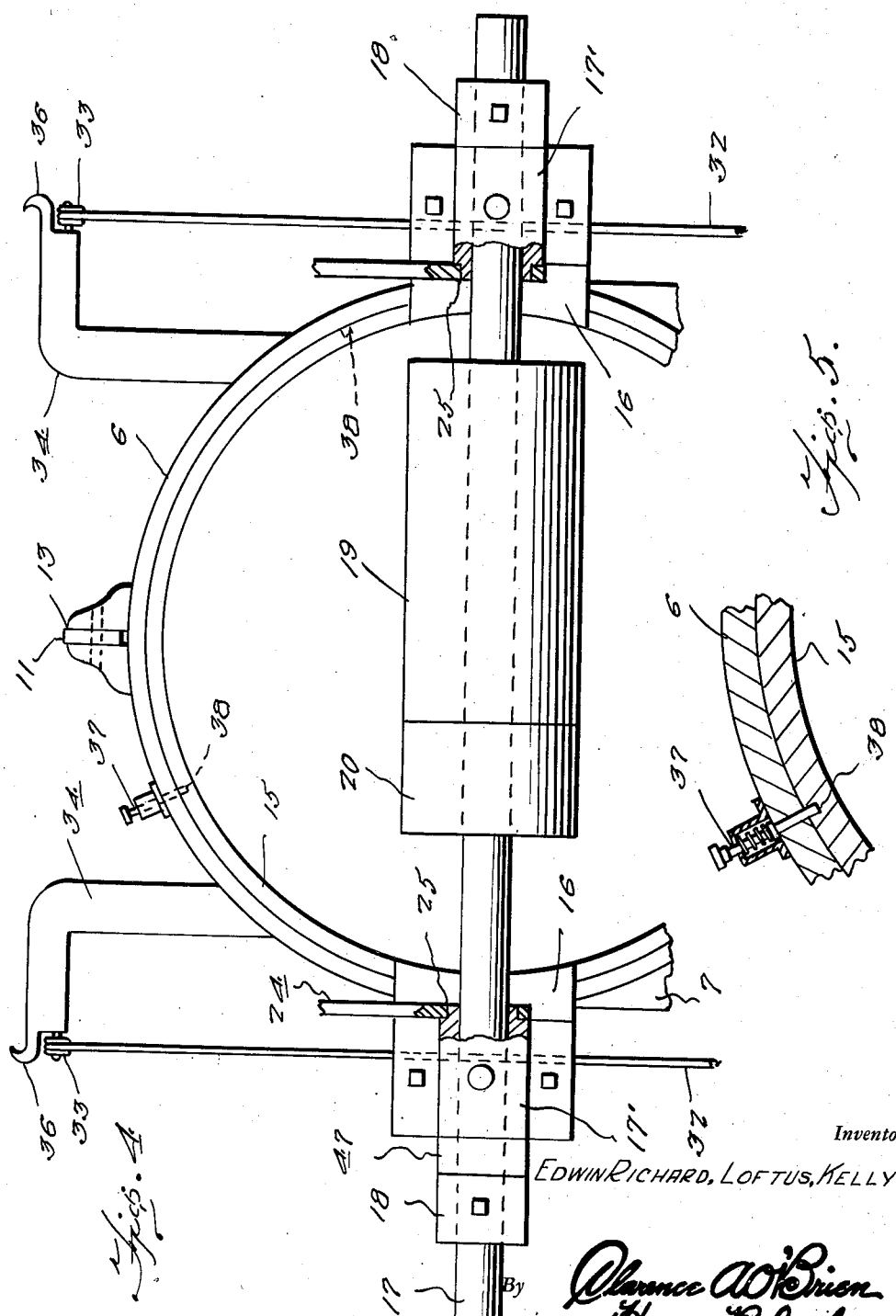

2,461,384

UNITED STATES PATENT OFFICE 2,461,384

TRACTOR-MOUNTED TIMBER SAWING APPARATUS

Edwin Richard Loftus Kelly, Neuse, N. C.

Application December 24, 1943, Serial No. 515,535

2 Claims. (Cl. 143—43)

1

This invention relates to timber sawing apparatus, and has more particular reference to sawing apparatus for felling trees and for cutting the trees into short lengths or logs after being felled.

The primary object of the present invention is to provide an apparatus of the above kind which is comparatively simple in construction, efficient in use, and otherwise adapted for meeting with the requirements for a successful commercial use.

The present apparatus is designed for mounting upon a suitable support, such as a tractor, and includes a swinging saw-carrying frame, improved means for mounting the saw-carrying frame so that it may be readily shifted to position the saw horizontally for felling trees, or vertically for cutting the trees into logs.

Means are provided for efficiently mounting the apparatus upon a tractor so that the saw-carrying frame will be located in front, back or side of said tractor, means being provided which are operable from the driver's seat of the tractor for swinging the saw-carrying frame and thereby feeding the saw to its work when in either vertical or horizontal position.

The present invention provides driving means for the saw which will remain operative when the saw-carrying frame is shifted to either operative position, and means is provided for counterbalancing the saw-carrying frame when arranged for vertical swinging movement with the saw vertically disposed, as in cutting the trees into logs.

Specific objects and features of the present invention will become apparent from the following description when considered in connection with the accompanying drawings, and the invention consists in the novel form, combination and arrangement of parts hereinafter more fully described, shown in said drawings and claimed.

In the drawings, wherein like reference characters indicate corresponding parts throughout the several views:

Figure 1 is a perspective view showing the present sawing apparatus conditioned for sawing felled trees into short lengths or logs.

Figure 2 is a view similar to Figure 1 showing the apparatus conditioned for use in felling trees.

Figure 3 is an enlarged fragmentary front elevational view showing the mounting of the saw shaft on the swinging saw-carrying frame.

Figure 4 is an enlarged fragmentary view, partly in front elevation and partly broken away and in section, showing the manner of mounting the counter shafts and the swinging saw-carrying frame upon the carrier ring.

Figure 5 is a fragmentary sectional detail view showing the locking bolt for holding the carrier ring against rotation relative to the supporting annulus, and Figure 6 is a transverse section through the supporting annulus and carrier ring, taken on the plane of line 6—6 of Figure 2.

Referring more in detail to the drawings, the illustrated embodiment of the invention includes a horizontal mounting frame 5 having a stationary vertical supporting annulus 6 rigidly mounted upon the front end thereof by suitable means such as uprights 7 and braces 8. Means is provided to mount the frame 5 upon the front end of a tractor or other support, which means is shown as particularly adapted for mounting the frame 5 on a tractor and comprising arms 9 rigid with and projecting rearwardly from the frame 5 and having attaching brackets 10 on the rear ends thereof, together with a further arm 11 having means at 12 to adjust the length thereof and attached at its forward end to the top of the annulus 6, as at 13 (Fig. 4), an attaching bracket 14 being provided upon the rear end of said arm 11.

A carrier ring 15 is rotatably fitted and suitably secured in the annulus 6, and fixed to opposite sides of the ring 15 at the front edge thereof are outwardly projecting mounting plates 16, on the front faces of which are secured diametrically opposed and aligned bearings 17. A countershaft 18 is journaled in the bearings 17 and has outwardly projecting ends on which are secured collars 18 for retaining the shaft in place. Secured on the countershaft 17 within the ring 15 are a relatively wide pulley 19 and a narrower pulley 20. The wider pulley 19 receives an endless driving belt 21 that extends rearwardly and passes about a further pulley 22 suitably mounted upon the tractor or other support and driven by a motor thereof.

The apparatus further includes a rectangular and suitably braced saw-carrying frame 23 having side members 24 that project beyond the inner end of the frame and are journaled upon reduced inner end portions of the bearings 17, as shown at 25, in Figure 4, thereby mounting the frame for swinging movement about the axis of shaft 17. Fixed on the outer end of frame 23 adjacent the sides of the latter are transversely aligned bearings 26 in which is journaled a shaft 27 having its ends projecting outwardly beyond the bearings 26. A circular saw 28 is secured on one projecting end of shaft 27, while circular weights 29 are mounted upon the other projecting end thereof so as to counterbalance the construction at this point. A pulley 30 is secured on the intermediate portion of shaft 27 and receives a driving belt 31 that also passes about the narrower pulley 20 of shaft 17 for driving the saw when the shaft 17 is driven.

It will thus be seen that when the carrier ring 15 is disposed with respect to the annulus 6, as shown in Figure 1, the saw-carrying frame 23 will be arranged for vertical swinging movement with the saw 28 vertically disposed. Accordingly, by swinging the frame 23 downwardly, the saw 28 may be engaged with and fed through felled trees for sawing the same into suitable lengths or logs. On the other hand, when the ring 15 is rotated relative to annulus 6 from the position of Figure 1 to the position of Figure 2, the saw-carrying frame will be vertically disposed with the saw 28 horizontally positioned below the lower side of the frame 23 so that, upon swinging the frame 23 laterally or horizontally, the saw may be engaged with and fed through a standing tree for felling the same. In the latter use, it is of course desirable to employ a suitable jack for causing the tree to fall away from the apparatus in the desired direction upon being felled.

Means is provided to counterbalance the saw-carrying frame 23 so that it will remain in any position to which it is swung when arranged for vertical swinging movement, as in Figure 1, and so that it may be manually moved in a proper manner without a great deal of manual effort for feeding the saw through the work. As shown, this counterbalancing means consists of flexible members or cables 32 attached at corresponding ends to opposite sides of the frame 23 and the outer end of the latter, and extending rearwardly over guide pulleys 33 carried by angular arms 34 rigid with and projecting from opposite sides of the upper portion of annulus 6. Suitable weights 35 are attached to the other ends of the flexible members 32, and it will be seen that these will rise and fall as the frame 23 is swung downwardly or upwardly. It is intended to detach the flexible members from the frame 23 when the latter is vertically disposed, as in Figure 2, at which time use of counterbalancing means is not necessary. The arms 34 are provided with hooks 36 from which the flexible members, together with their weights, may be suspended when not in use.

Means is provided to secure the ring 15 against rotation relative to annulus 6 when the frame 23 is either in horizontal position, as shown in Figure 1, or in vertical position, as shown in Figure 2, and this means may consist of a spring-projected bolt 37 carried by annulus 6 and arranged to be selectively engaged in the proper one of two sockets 38 provided in the ring 15 at spaced points so that one will align with the bolt 37 when the frame 23 is horizontally disposed, and the other will align therewith when the frame 23 is vertically disposed.

To facilitate manual swinging of the frame 23, suitable handles are provided. A short detachable handle 39 may be provided on the outer end of frame 23 so that an attendant may swing said frame from a position at the front of the apparatus when the frame is disposed for vertical swinging movement, as in Figure 1. However, a longer rearwardly extending handle may be provided for operation from the driver's seat when the apparatus is mounted upon a tractor. This longer handle may embody an upwardly and rearwardly extending arm 40 detachably applied to the outer end of frame 23 and having the forward end of a relatively long rod or handle member 41 pivoted to the rear upper end thereof, as at 42, said bar or handle member 41 being provided at its rear end with a hand grip 43. The handles 39 and 40, 41 are removable because they are not desired or most efficient for use in swinging the frame 23 when it is vertically disposed, as in Figure 2. For swinging the frame 23 when vertically positioned as in Figure 2, a different type of detachable handle is employed consisting of an angular rod or member having a short arm 44 at one end whose lower terminal may be engaged in a suitable socket carried by the side of the frame 23 which is uppermost in Figure 2, and a longer arm 45 extended rearwardly and provided at its rear end with a suitable handle bar 46. By swinging the rear end of arm 45 laterally, the frame 23 may be swung horizontally in the desired direction to engage the saw with and feed it through the work or to withdraw the saw relative to the work, as desired.

It will of course be understood that the belt 21 will be twisted when the frame 23 is positioned, as in Figure 1, with the axis of pulleys 19 and 20 disposed at right angles to the axis of pulley 22. The relatively long pulley 19 insures maintaining driving relation with belt 21 when so twisted. Also, to properly sustain the weight of parts and prevent undue wear, suitable thrust bearings 47 and 48 are provided respectively between the bearing 17 and collar 18 and the bearing 26 and collar 49 which are uppermost when the frame 23 is vertically disposed, as in Figure 2. The collars 49 are provided on shaft 27 outwardly of bearings 26 to retain the shaft 27 in place and against endwise movement.

The member 11 is made adjustable in length so that the upper portion of annulus 6 may be displaced forwardly a slight distance so as to tighten belt 21.

If the apparatus is to be used for felling trees, the frame 23 will be vertically positioned, as in Figure 2, and the handle 44, 45, 46 will be swung laterally so as to bring saw 28 into engagement with the trunk of the tree and then feed the saw through the latter until the felling operation is completed. The frame 23 may then be swung backwardly away from the work. In cutting the felled tree into logs of suitable length, the frame 23 will be disposed for vertical swinging movement, as in Figure 1, whereupon the desired handle will be employed for swinging the frame 23 downwardly against the action of counterweights 35, thereby engaging the saw 28 with the tree trunk and feeding it through the latter. The frame 23 is then swung upwardly and the operation is repeated at a new point along the length of the tree trunk until it has been entirely cut up into logs of the required length. By mounting the apparatus upon a tractor or similar mobile support, the desired change in relation between the apparatus and the work may be readily and quickly made.

From the foregoing description, it is believed that the construction and operation, as well as the advantages of the present invention, will be readily understood and appreciated by those skilled in the art. Minor changes in the details of construction illustrated and described are contemplated, such as fairly fall within the spirit and scope of the invention as claimed.

What I claim as new is:

1. A timber sawing attachment for tractors, comprising a horizontal rectangular frame having rigid uprights rising from the front end thereof, a vertical stationary annular band rigidly mounted transversely of and upon the front end of the frame and secured to and arranged between said uprights, a plurality of arms, one projecting rearwardly from and centrally of the top of the stationary annular band and two from the rear end of the frame and having attaching brackets at their rear ends for mounting the frame on the front of the tractor, an annular carrier band rotatably fitted in the stationary annular band, mounting plates fixed to opposite sides of the carrier band at the front edge of the latter, diametrically opposed and transversely aligned bearings secured on the front faces of said plates, a transverse driven shaft journaled in said bearings, a rectangular swinging saw frame having rearwardly projecting side members journaled on said shaft, transversely aligned bearings secured on the front end of said saw frame and having a second transverse shaft journaled therein, said second shaft having a projecting end carrying a circular saw, a belt gearing between said shafts, manually releasable means to secure the carrier band against rotation relative to the stationary band to retain the saw frame with its pivotal axis either horizontal or vertical, and means for swinging said saw frame to feed the saw to the work.

2. A timber sawing attachment for tractors, comprising a horizontal rectangular frame having rigid uprights rising from the front end thereof, a vertical stationary annular band rigidly mounted transversely of and upon the front end of the frame and secured to and arranged between said uprights, a plurality of arms, one projecting rearwardly from and centrally of the top of the stationary annular band and two from the rear end of the frame and having attaching brackets at their rear ends for mounting the frame on the front of the tractor, an annular carrier band rotatably fitted in the stationary annular band, mounting plates fixed to opposite sides of the carrier band at the front edge of the latter, diametrically opposed and transversely aligned bearings secured on the front faces of said plates, a transverse driven shaft journaled in said bearings, a rectangular swinging saw frame having rearwardly projecting side members journaled on said shaft, transversely aligned bearings secured on the front end of said saw frame and having a second transverse shaft journaled therein, said second shaft having a projecting end carrying a circular saw, a belt gearing between said shafts, manually releasable means to secure the carrier band against rotation relative to the stationary band to retain the saw frame with its pivotal axis either horizontal or vertical, means for swinging said saw frame to feed the saw to the work, arms rigid with and rising from the top of the stationary band at opposite sides of the latter, guides carried by said arms, and weighted cables passing over and extending forwardly from said guides and attached at their forward ends to opposite sides of the front end of the saw frame for counter-balancing the latter when arranged to swing vertically.

EDWIN RICHARD LOFTUS KELLY.

REFERENCES CITED

The following references are of record in the file of this patent:

UNITED STATES PATENTS

| Number | Name | Date |
|---|---|---|
| 827,548 | Martin | July 31, 1906 |
| 1,126,312 | Strauss | Jan. 26, 1915 |
| 1,316,743 | Roche et al. | Sept. 23, 1919 |
| 1,318,324 | Keon | Oct. 7, 1919 |
| 1,462,764 | Nyquist et al. | July 24, 1923 |
| 1,473,536 | Avery | Nov. 6, 1923 |
| 1,798,402 | Dibble | Mar. 31, 1931 |
| 1,832,599 | Wilhelm et al. | Nov. 17, 1931 |
| 2,274,902 | Knight | Mar. 3, 1942 |
| 2,312,287 | Renner | Feb. 23, 1943 |
| 2,354,095 | Adams | July 18, 1944 |
| 2,354,625 | Van Sickle | July 25, 1944 |
| 2,365,408 | Hillyer | Dec. 19, 1944 |